US012598054B2

(12) United States Patent
Kitagawa et al.

(10) Patent No.:  US 12,598,054 B2
(45) Date of Patent:       Apr. 7, 2026

(54) IN-VEHICLE DEVICE, TIME SYNCHRONIZATION METHOD, AND TIME SYNCHRONIZATION PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Kazuki Kitagawa, Yokkaichi (JP); Tadashi Matsumoto, Yokkaichi (JP); Yojiro Suyama, Osaka (JP); Akihito Iwata, Osaka (JP); Ryo Yamane, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 445 days.

(21) Appl. No.: 18/040,791

(22) PCT Filed: Jul. 30, 2021

(86) PCT No.: PCT/JP2021/028438
§ 371 (c)(1),
(2) Date: Feb. 6, 2023

(87) PCT Pub. No.: WO2022/030404
PCT Pub. Date: Feb. 10, 2022

(65) Prior Publication Data
US 2024/0031123 A1     Jan. 25, 2024

(30) Foreign Application Priority Data

Aug. 7, 2020     (JP) ................................. 2020-134524

(51) Int. Cl.
H04L 7/00 (2006.01)
H04L 67/12 (2022.01)
B60R 16/023 (2006.01)

(52) U.S. Cl.
CPC ............ H04L 7/0033 (2013.01); H04L 67/12 (2013.01); B60R 16/0231 (2013.01)

(58) Field of Classification Search
CPC ... H04L 7/0033; H04L 67/12; B60R 16/0231; B60R 16/023
See application file for complete search history.

(56) References Cited

U.S. PATENT DOCUMENTS 7,593,811 B2 *  9/2009  Schmidt ............... G05D 1/0295
                                                        701/96
9,003,500 B2 *  4/2015  Oglesbee .............. H04L 67/125
                                                        707/610
(Continued)

FOREIGN PATENT DOCUMENTS

CN      109327899 A      2/2019
JP     2000-242618 A     9/2000
(Continued)

OTHER PUBLICATIONS

International Search Report, Application No. PCT/JP2021/028438, mailed Sep. 28, 2021. ISA/Japan Patent Office.

*Primary Examiner* — Chandrahas B Patel
(74) *Attorney, Agent, or Firm* — Brooks Kushman PC

(57) ABSTRACT

An in-vehicle device includes: a processing unit configured to perform time synchronization between own device, which is the in-vehicle device, and another device, which is another in-vehicle device, based on a data propagation delay time between the other device and the own device, and detect occurrence of an update event regarding the propagation delay time, wherein in a case where the processing unit detects occurrence of the update event, the processing unit (Continued)

requests time information used for updating the propagation delay time from the other device.

13 Claims, 9 Drawing Sheets

(56)                    References Cited

U.S. PATENT DOCUMENTS

| | | | |
|---|---|---|---|
| 11,282,308 B2 * | 3/2022 | Jung | H04L 12/40136 |
| 11,502,873 B2 | 11/2022 | Iwata et al. | |
| 2016/0173530 A1 | 6/2016 | Miyake | |
| 2018/0084055 A1 * | 3/2018 | Mong | H04L 67/12 |
| 2020/0333435 A1 | 10/2020 | Mayer et al. | |
| 2021/0006435 A1 | 1/2021 | Iwata et al. | |
| 2021/0021976 A1 * | 1/2021 | Kim | H04W 76/10 |
| 2024/0031123 A1 | 1/2024 | Kitagawa et al. | |

FOREIGN PATENT DOCUMENTS

| | | |
|---|---|---|
| JP | 2016-017806 A | 2/2016 |
| JP | 2018-202842 A | 12/2018 |
| JP | 2019-212015 A | 12/2019 |
| JP | 7052837 B2 | 4/2022 |
| WO | 2019/171669 A1 | 9/2019 |

* cited by examiner

AFTER CONFIGURATION CHANGE

BEFORE CONFIGURATION CHANGE

FIG. 9

IN-VEHICLE DEVICE, TIME SYNCHRONIZATION METHOD, AND TIME SYNCHRONIZATION PROGRAM

CROSS-REFERENCE TO RELATED APPLICATIONS

This application is the U.S. national stage of PCT/JP2021/0248438 filed on Jul. 30, 2021, which claims priority of Japanese Patent Application No. JP 2020-134524 filed on Aug. 7, 2020, the contents of which are incorporated herein.

TECHNICAL FIELD

The present disclosure relates to an in-vehicle device, a time synchronization method, and a time synchronization program.

BACKGROUND

The following in-vehicle network system is disclosed in JP 2013-168865A (Patent Document 1). This in-vehicle network system includes: an in-vehicle control device provided with a memory for storing definition data that defines an implementation-dependent portion of a communication protocol used in the in-vehicle network; and a communication protocol issuing device that issues the definition data to the in-vehicle control device. When a registration request for allowing the in-vehicle control device to join the in-vehicle network is received from a registration device for allowing the in-vehicle control device to join the in-vehicle network, the communication protocol issuing device performs authentication on the registration device, and then creates definition data conforming to implementation in the in-vehicle network, and transmits the created definition data to the registration device. The registration device receives the definition data transmitted by the communication protocol issuing device, and requests the in-vehicle control device to store the received definition data in the memory. The in-vehicle control device receives the definition data from the registration device, stores the definition data in the memory, and, in accordance with the portion defined by the definition data, performs communication over the in-vehicle network in compliance with the communication protocol.

Conventionally, techniques have been developed regarding in-vehicle networks that include multiple in-vehicle devices.

For example, the data propagation delay time between in-vehicle devices in an in-vehicle network is periodically updated in accordance with a protocol defined by a standard such as IEEE 802.1, and the updated propagation delay time is used in order to perform time synchronization among the in-vehicle devices.

However, when the data propagation delay time is updated, the processing load can possibly increase due to the update processing, and there is a possibility that other processing such as processing related to vehicle operation control cannot be performed smoothly.

The technology of the present disclosure has been made to solve the aforementioned problems, and an object thereof is to provide an in-vehicle device, a time synchronization method, and a time synchronization program that enable smoothly performing time synchronization with use of the data propagation delay time between in-vehicle devices, and also enable reducing the load of update processing.

SUMMARY

An in-vehicle device according to the present disclosure includes: a processing unit configured to perform time synchronization between own device, which is the in-vehicle device, and another device, which is another in-vehicle device, based on a data propagation delay time between the other device and the own device, and detect occurrence of an update event regarding the propagation delay time, wherein in a case where the processing unit detects occurrence of the update event, the processing unit requests time information used for updating the propagation delay time from the other device.

A time synchronization method in an in-vehicle device according to the present disclosure includes the steps of: detecting occurrence of an update event regarding updating of a propagation delay time between own device, which is the in-vehicle device, and another device, which is another in-vehicle device; requesting, if occurrence of the update event is detected, time information used for updating the propagation delay time from the other device; updating the propagation delay time based on the time information received from the other device; and performing time synchronization with the other device based on the updated propagation delay time.

A time synchronization program used in an in-vehicle device according to the present disclosure causes a computer to function as: a processing unit configured to perform time synchronization between own device, which is the in-vehicle device, and another device, which is another in-vehicle device, based on a data propagation delay time between the other device and the own device, and detect occurrence of an update event regarding the propagation delay time, wherein in a case where the processing unit detects occurrence of the update event, the processing unit requests time information used for updating the propagation delay time from the other device.

One aspect of the present disclosure can be realized as a semiconductor integrated circuit that realizes a part or the entirety of the in-vehicle device, or an in-vehicle network system that includes the in-vehicle device.

Effects of the Present Disclosure

With the present disclosure, time synchronization can be performed smoothly using the data propagation delay time between the in-vehicle devices, and the load of update processing can be reduced.

BRIEF DESCRIPTION OF THE DRAWINGS

FIG. 9 is a diagram showing a sequence (Example 2) of propagation delay time updating and time correction performed by in-vehicle devices in the in-vehicle network system according to this embodiment of the present disclosure.

DETAILED DESCRIPTION OF PREFERRED EMBODIMENTS

Figure 1:
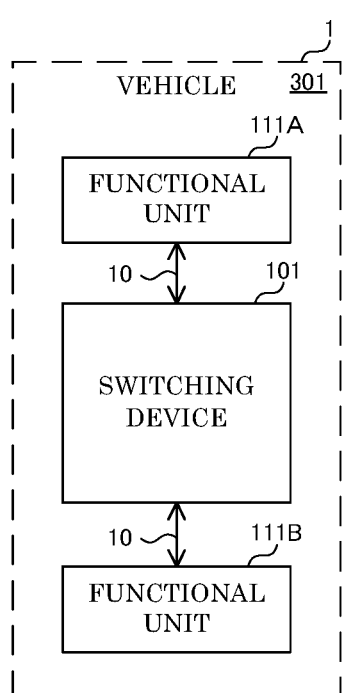
FIG. 1 is a diagram showing the configuration of an in-vehicle network system according to an embodiment of the present disclosure.

First, aspects of an embodiment of the present disclosure are listed and described.

An in-vehicle device according to an embodiment of the present disclosure includes: a processing unit configured to perform time synchronization between own device, which is the in-vehicle device, and another device, which is another in-vehicle device, based on a data propagation delay time between the other device and the own device, and detect occurrence of an update event regarding the propagation delay time, wherein in a case where the processing unit detects occurrence of the update event, the processing unit requests time information used for updating the propagation delay time from the other device.

In this way, if the occurrence of an update event is detected, time information is requested and propagation delay time update processing is performed using the time information, thus making it possible to suppress the frequency of update processing to a lower level than in the case of performing update processing periodically. Accordingly, time synchronization can be performed smoothly using the data propagation delay time between the in-vehicle devices, and the load of update processing can be reduced.

Preferably, the processing unit detects, as the update event, that an ignition switch of a vehicle provided with the own device was switched on.

When the ignition switch of the vehicle is switched on, the in-vehicle devices in the vehicle start up, and the data propagation delay time between the in-vehicle devices can possibly change. Focusing on this fact, with a configuration capable of detecting an event in which the propagation delay time possibly changes, it is possible to perform update processing of the propagation delay time at a more appropriate timing.

Preferably, the processing unit detects, as the update event, that a configuration of an in-vehicle network including the own device was changed.

For example, the data propagation delay time between in-vehicle devices can possibly change due to a new in-vehicle device being added to the in-vehicle network. Focusing on this fact, with a configuration capable of detecting an event in which the propagation delay time possibly changes, it is possible to perform update processing of the propagation delay time at a more appropriate timing.

Preferably, the processing unit detects, as the update event, that a temperature in a vehicle provided with the own device satisfies a predetermined condition.

A change in the temperature inside the vehicle can possibly be accompanied by a change in the data propagation delay time between in-vehicle devices. Focusing on this fact, with a configuration capable of detecting an event in which the propagation delay time possibly changes, it is possible to perform update processing of the propagation delay time at a more appropriate timing.

More preferably, the temperature in the vehicle is a temperature of a communication line between the own device and the other device.

According to this configuration, a more appropriate event can be detected as an event in which the data propagation delay time possibly changes.

Preferably, the in-vehicle device further includes a switching unit configured to relay data between a first other device and a second other device that are the other devices, wherein the first other device transmits, to the in-vehicle device, a first time information request that requests first time information used for updating a data propagation delay time between the in-vehicle device and the first other device, the switching unit receives the first time information request from the first other device and outputs the received first time information request to the processing unit, the processing unit receives the first time information request from the switching unit and outputs, to the switching unit, a second time information request that requests second time information used for updating a data propagation delay time between the second other device and the own device, and the switching unit receives the second time information request from the processing unit and transmits the received second time information request to the second other device.

In this way, if a request for time information is received from the first other in-vehicle device, the request for time information is transmitted to the second other in-vehicle device, and therefore even if an update event not detected by the in-vehicle device that includes the switching unit occurs, it is possible to perform processing for updating the propagation delay time in that in-vehicle device.

A time synchronization method in an in-vehicle device according to an embodiment of the present disclosure includes the steps of: detecting occurrence of an update event regarding updating of a propagation delay time between own device, which is the in-vehicle device, and another device, which is another in-vehicle device; requesting, if occurrence of the update event is detected, time information used for updating the propagation delay time from the other device; updating the propagation delay time based on the time information received from the other device; and performing time synchronization with the other device based on the updated propagation delay time.

In this way, if the occurrence of an update event is detected, time information is requested and propagation delay time update processing is performed using the time information, thus making it possible to suppress the frequency of update processing to a lower level than in the case of performing update processing periodically. Accordingly, time synchronization can be performed smoothly using the data propagation delay time between the in-vehicle devices, and the load of update processing can be reduced.

A time synchronization program used in an in-vehicle device according to an embodiment of the present disclosure causes a computer to function as: a processing unit configured to perform time synchronization between own device, which is the in-vehicle device, and another device, which is another in-vehicle device, based on a data propagation delay time between the other device and the own device, and detect occurrence of an update event regarding the propagation delay time, wherein in a case where the processing unit detects occurrence of the update event, the processing unit requests time information used for updating the propagation delay time from the other device.

In this way, if the occurrence of an update event is detected, time information is requested and propagation delay time update processing is performed using the time information, thus making it possible to suppress the frequency of update processing to a lower level than in the case of performing update processing periodically. Accordingly, time synchronization can be performed smoothly using the data propagation delay time between the in-vehicle devices, and the load of update processing can be reduced.

Hereinafter, embodiments of the present disclosure will be described with reference to the drawings. Note that, in the drawings, the same reference numerals are given to the same or corresponding components in the drawings, and redundant descriptions thereof are not repeated. Furthermore, at least parts of the embodiments described below may be suitably combined.

Configuration and Basic Operation

Overall Configuration

FIG. 1 is a diagram showing the configuration of an in-vehicle network system according to an embodiment of the present disclosure. As shown in FIG. 1, an in-vehicle network system 301 is provided in a vehicle 1, and includes a switching device 101 and a plurality of functional units 111. FIG. 1 shows an example in which two functional units 111A and 111B are provided as the functional units 111. The switching device 101 and the functional units 111 are each an in-vehicle device such as an ECU (Electronic Control Unit).

The switching device 101 is connected to the functional units 111 via Ethernet (registered trademark) cables 10, for example, and is capable of communicating with the functional units 111 connected thereto.

Specifically, the switching device 101 performs relay processing for relaying data from one functional unit 111 to another functional unit 111. Information is exchanged between the switching device 101 and the functional units 111 using Ethernet frames in which IP packets are stored, for example.

Examples of the functional units 111 include an external communication ECU, a sensor, a camera, a navigation device, an automatic driving processing ECU, an engine control device, an AT (Automatic Transmission) control device, an HEV (Hybrid Electric Vehicle) control device, a brake control device, a chassis control device, a steering control device, and an instrument display control device.

Switching Device

Figure 2:
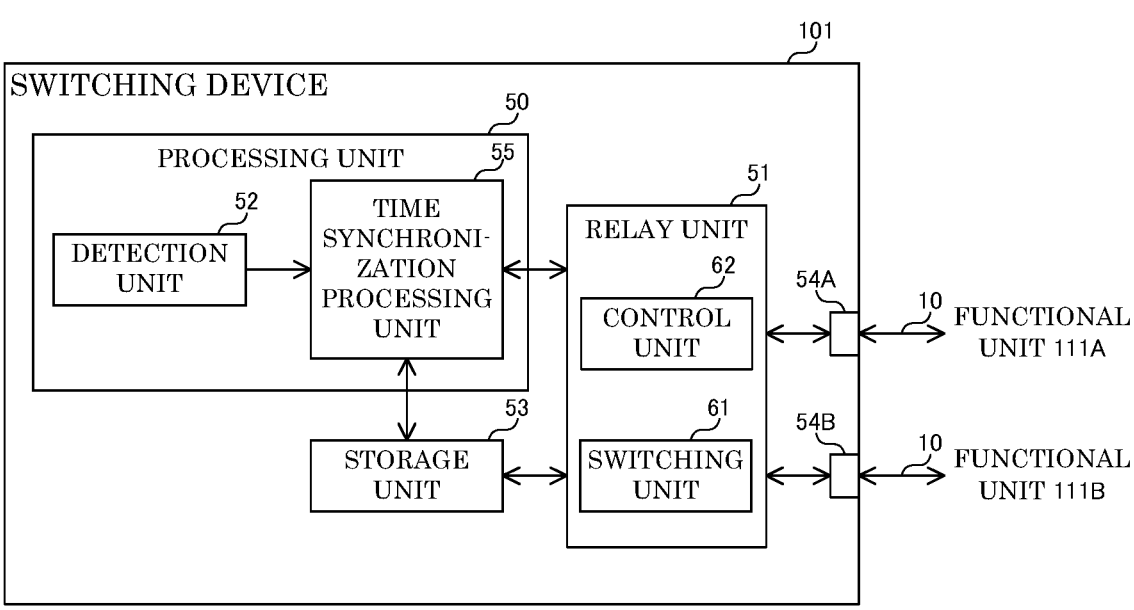
FIG. 2 is a diagram showing the configuration of the switching device according to this embodiment of the present disclosure.

FIG. 2 is a diagram showing the configuration of the switching device according to this embodiment of the present disclosure. As shown in FIG. 2, the switching device 101 includes a processing unit 50, a relay unit 51, a storage unit 53, and a plurality of communication ports 54. The relay unit 51 includes a switching unit 61 and a control unit 62. The processing unit 50 includes a detection unit 52 and a time synchronization processing unit 55. The processing unit 50 and the relay unit 51 are each realized by a processor such as a CPU (Central Processing Unit) or a DSP (Digital Signal Processor), for example.

Relay Processing

The communication ports 54 are terminals to which the Ethernet cables 10 can be connected, for example. Note that the communication ports 54 may be integrated circuit terminals. Each of the communication ports 54 is connected to one of the functional units 111 via an Ethernet cable 10. In this example, a communication port 54A is connected to the functional unit 111A, and a communication port 54B is connected to the functional unit 111B.

The storage unit 53 is a non-volatile memory, for example. The storage unit 53 stores an address table Tal that indicates the correspondence between the port numbers of the communication ports 54 and the MAC (Media Access Control) addresses of connected devices.

The switching unit 61 relays data between other in-vehicle devices. Specifically, when an Ethernet frame transmitted from one functional unit 111 is received via the communication port 54 that corresponds to that functional unit 111, the switching unit 61 performs relay processing for the received Ethernet frame.

More specifically, the switching unit 61 references the address table Tal stored in the storage unit 53 and specifies the port number that corresponds to the destination MAC address included in the received Ethernet frame. The switching unit 61 then transmits the received Ethernet frame via the communication port 54 that has the specified port number.

Updating of Data Propagation Delay Time Between Master Functional Unit and Switching Device The switching device 101 updates a data propagation delay time Td1 between the master functional unit 111 and the switching device 101. Here, the functional unit 111A is the master functional unit 111, and the functional unit 111B is the slave functional unit 111. The functional unit 111A holds the reference time in the in-vehicle network system 301.

Figure 3:
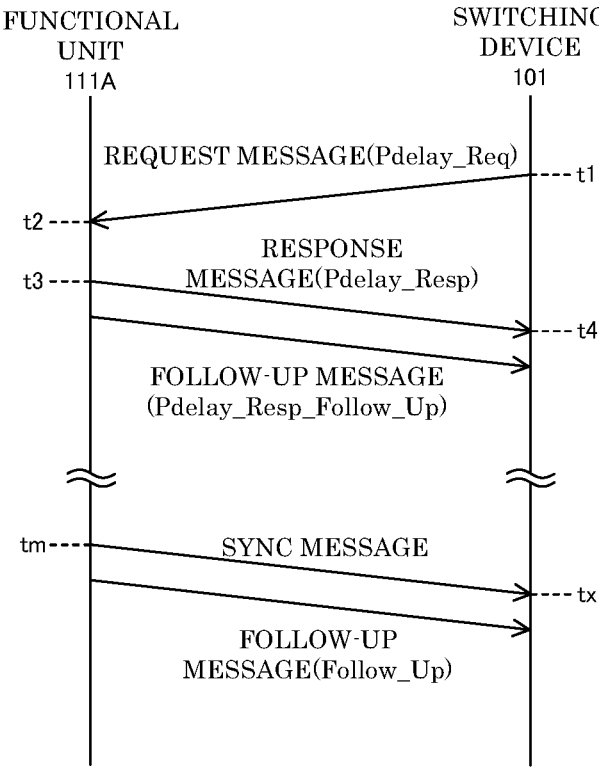
FIG. 3 is a diagram for describing a propagation delay time updating method performed by the switching device according to this embodiment of the present disclosure.

FIG. 3 is a diagram for describing a propagation delay time updating method performed by the switching device according to this embodiment of the present disclosure.

More specifically, as shown in FIGS. 2 and 3, the detection unit 52 detects the occurrence of an update event regarding the propagation delay time Td1. As one example of the detected update event, the detection unit 52 detects that the in-vehicle network system 301 has started up (i.e., that the ignition switch of the vehicle 1 was switched on). The detection unit 52 then notifies the time synchronization processing unit 55 that the occurrence of an update event was detected.

Upon receiving the notification of the occurrence of the update event from the detection unit 52, the time synchronization processing unit 55 updates the data propagation delay time Td1 between the functional unit 111A and the switching device 101. More specifically, the time synchronization processing unit 55 transmits a time information request (Pdelay_Req) for requesting time information used for updating the propagation delay time Td1, to the functional unit 111A via the relay unit 51 and the communication port 54A. Hereinafter, the time information request will also be referred to as a "request message".

Upon receiving the request message transmitted from the switching device 101, the functional unit 111A transmits time information (Pdelay_Resp) to the switching device 101 in response to the request message. At this time, the functional unit 111A also transmits a reception time t2 of the request message in the time information. Hereinafter, the time information will also be referred to as a "response message".

After transmitting the response message, the functional unit 111A also transmits a follow-up message (Pdelay_Resp_Follow_Up) that includes a transmission time t3 of the response message, to the switching device 101.

The response message and the follow-up message that were transmitted from the functional unit 111A are received by the control unit 62 of the switching device 101 via the communication port 54A. The control unit 62 then notifies the time synchronization processing unit 55 of the time t2 included in the response message and the time t3 included in the follow-up message. The control unit 62 also notifies the time synchronization processing unit 55 of a transmission time t1 of the request message and a reception time t4 of the response message.

The time synchronization processing unit 55 calculates the data propagation delay time Td1 between the functional unit 111A and the switching device 101 based on the times t1, t2, t3, and t4 notified from the control unit 62. Specifically, the time synchronization processing unit 55 performs the following calculation: propagation delay time Td1=((t4−t1)−(t3−t2))/2. The time synchronization processing unit 55 then updates the propagation delay time Td1 stored in the storage unit 53 to the newly calculated propagation delay time Td1.

Correction of Time in Switching Device

The master functional unit 111A periodically or irregularly transmits a Sync message to the switching device 101. After transmitting the Sync message, the functional unit 111A also transmits a follow-up message (Follow_Up) that includes a transmission time tm of the Sync message to the switching device 101.

The control unit 62 of the switching device 101 receives the Sync message and the follow-up message that were transmitted from the functional unit 111A, via the communication port 54A. The control unit 62 then notifies the time synchronization processing unit 55 of the time tm included in the follow-up message and a reception time tx of the Sync message.

The time synchronization processing unit 55 performs time synchronization with the functional unit 111A based on the times tm and tx notified from the control unit 62 and the propagation delay time Td1 stored in the storage unit 53. More specifically, based on the times tm and tx and the propagation delay time Td1, the time synchronization processing unit 55 calculates a time difference Tx1=tm−Td1−tx, which is the difference between the time in the functional unit 111A and the time in the switching device 101.

The time synchronization processing unit 55 corrects the time in the switching device 101 using the calculated time difference Tx1. Accordingly, time synchronization is achieved between the functional unit 111A and the switching device 101.

Slave Functional Unit

Figure 4:
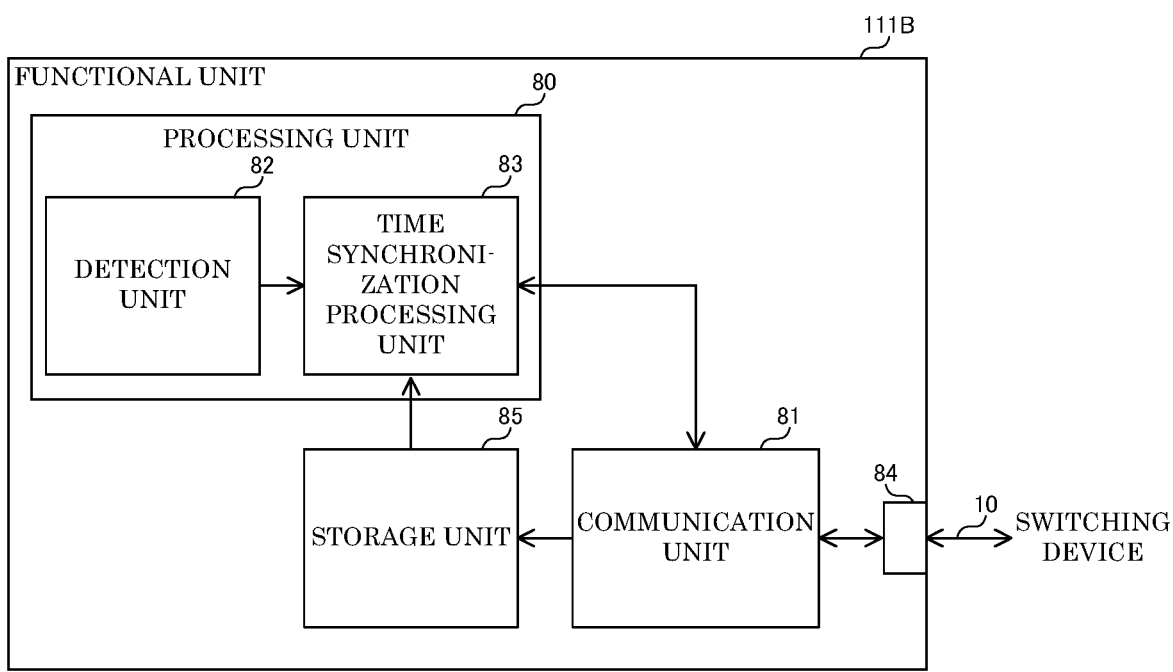
FIG. 4 is a diagram illustrating the configuration of the slave functional unit according to this embodiment of the present disclosure.

FIG. 4 is a diagram illustrating the configuration of the slave functional unit according to this embodiment of the present disclosure. As shown in FIG. 4, the slave functional unit 111B includes a processing unit 80, a communication unit 81, a communication port 84, and a storage unit 85. The processing unit 80 includes a detection unit 82 and a time synchronization processing unit 83. The processing unit 80 and the communication unit 81 are each realized by a processor such as a CPU or a DSP, for example. The storage unit 85 is a non-volatile memory, for example.

The communication port 84 is a terminal to which an Ethernet cable 10 can be connected, for example. Note that the communication port 84 may be an integrated circuit terminal or the like. The communication port 84 is connected to the switching device 101 via an Ethernet cable 10. Updating of Data Propagation Delay Time Between Switching Device and Slave Functional Unit The functional unit 111B updates a data propagation delay time Td2 between the switching device 101 and the functional unit 111B.

Figure 5:
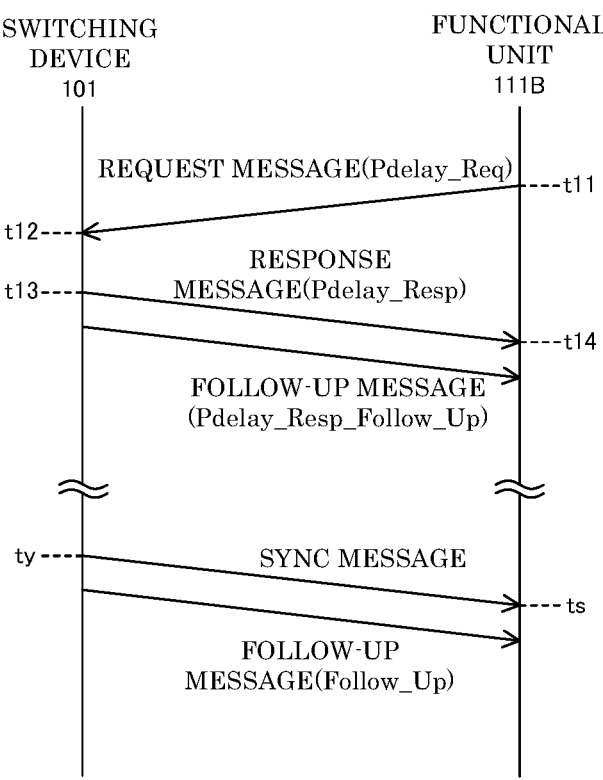
FIG. 5 is a diagram for describing a propagation delay time updating method performed by the functional unit according to this embodiment of the present disclosure.

FIG. 5 is a diagram for describing a propagation delay time updating method performed by the functional unit according to this embodiment of the present disclosure.

More specifically, as shown in FIGS. 4 and 5, similarly to the detection unit 52 in the switching device 101 shown in FIG. 2, the detection unit 82 detects the occurrence of an update event regarding the propagation delay time Td2, and notifies the time synchronization processing unit 83 of the occurrence of the update event.

Similarly to the time synchronization processing unit 55 of the switching device 101 shown in FIG. 2, the time synchronization processing unit 83 receives the notification of the occurrence of the update event from the detection unit 82, and accordingly updates the data propagation delay time Td2 between the switching device 101 and the functional unit 111B. More specifically, the time synchronization processing unit 83 transmits a request message for requesting time information used for updating the propagation delay time Td2, to the switching device 101 via the communication unit 81 and the communication port 84.

When the request message transmitted from the functional unit 111B is received via the communication port 54B, the control unit 62 of the switching device 101 outputs the request message to the time synchronization processing unit 55.

Upon receiving the request message from control unit 62, the time synchronization processing unit 55 transmits a response message in response to the request message, to the functional unit 111B via the relay unit 51 and the communication port 54B. At this time, the time synchronization processing unit 55 also transmits a reception time t12 of the request message in the response message.

After transmitting the response message, the time synchronization processing unit 55 also transmits a follow-up message that includes a transmission time t13 of the response message to the functional unit 111B via the relay unit 51 and the communication port 54B.

The response message and the follow-up message that were transmitted from the switching device 101 are received by the communication unit 81 of the functional unit 111B via the communication port 84. The communication unit 81 then notifies the time synchronization processing unit 83 of the time t12 included in the response message and the time t13 included in the follow-up message. The communication unit 81 also notifies the time synchronization processing unit 83 of a transmission time t11 of the request message and a reception time t14 of the response message.

The time synchronization processing unit 83 calculates the data propagation delay time Td2 between the switching device 101 and the functional unit 111B based on the times t11, t12, t13, and t14 notified from the communication unit 81. Specifically, the time synchronization processing unit 83 performs the following calculation: propagation delay time Td2=((t14−t11)−(t13−t12))/2. The time synchronization processing unit 83 then updates the propagation delay time Td2 stored in the storage unit 85 to the newly calculated propagation delay time Td2.

Correction of Time in Slave Functional Unit

The time synchronization processing unit 55 of the switching device 101 periodically or irregularly transmits a Sync message to the slave-side functional unit 111B. After transmitting the Sync message, the time synchronization processing unit 55 also transmits a follow-up message that includes a transmission time ty of the Sync message to the functional unit 111B.

The communication unit 81 of the functional unit 111B receives the Sync message and the follow-up message that were transmitted from the switching device 101, via the communication port 84. The communication unit 81 then notifies the time synchronization processing unit 83 of the time ty included in the follow-up message and a reception time ts of the Sync message.

The time synchronization processing unit 83 performs time synchronization with the switching device 101 based on the times ty and ts notified from the communication unit 81 and the propagation delay time Td2 stored in the storage unit 85. More specifically, the time synchronization processing unit 83 calculates a time difference Tx2=ty−Td2−ts, which is the difference between the time in the switching device 101 and the time in the functional unit 111B. The time synchronization processing unit 83 then uses the calculated time difference Tx2 to correct the time in the functional unit 111B.

Here, when time synchronization is achieved between the master functional unit 111A and the switching device 101, the time ty included in the follow-up message transmitted from the switching device 101 to the functional unit 111B is synchronized with the time in the functional unit 111A. For this reason, the time synchronization processing unit 83 of the functional unit 111B performs time correction to achieve time synchronization between the functional unit 111B and the switching device 101, and as a result, time synchronization is achieved between the functional unit 111B and the functional unit 111A.

Variation of Switching Device

The time synchronization processing unit 55 of the switching device 101 may be configured to transmit a request message to the functional unit 111A not only in the case of receiving a notification of the occurrence of an update event from the detection unit 52, but also in the case of receiving a request message from the functional unit 111B.

In other words, upon receiving a request message for requesting time information used for updating the propagation delay time Td2 from the functional unit 111B, the time synchronization processing unit 55 transmits a response message and a follow-up message to the functional unit 111B, and also transmits a request message for requesting time information used for updating the propagation delay time Td1 to functional unit 111A.

Other Specific Examples of Update Events

The detection unit 52 of the switching device 101 and the detection unit 82 of the functional unit 111B are each not limited to being configured to detect that the ignition switch of the vehicle 1 was switched on as an update event, and may be configured to detect another event in which the propagation delay time possibly changes as an update event.

Specific Example 1

The detection unit 52 of the switching device 101 and the detection unit 82 of the functional unit 111B may each detect, as an update event, that the configuration of the in-vehicle network system 301 that includes the in-vehicle device has been changed.

Figure 6:
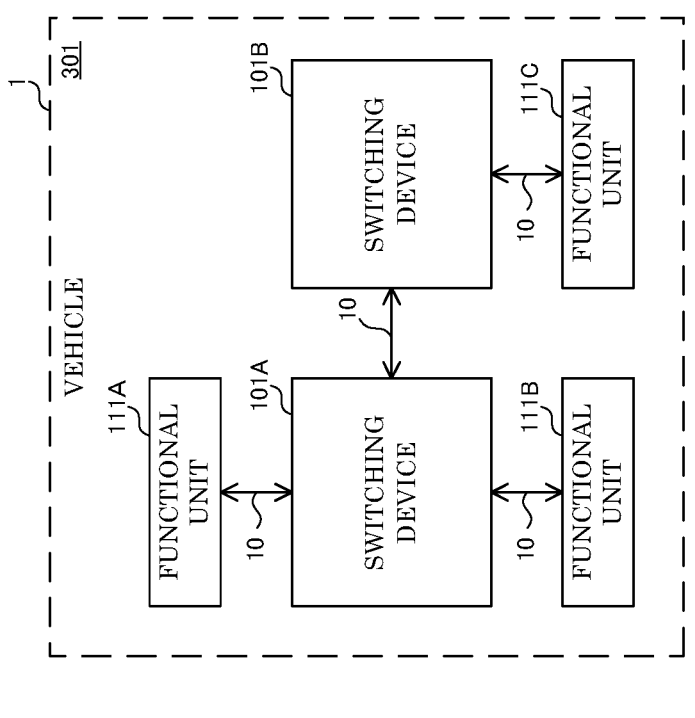
FIG. 6 is a diagram showing a state in which the configuration of the in-vehicle network system according to the embodiment of the present disclosure has been changed.
Figure 6:
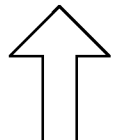
Figure 6:
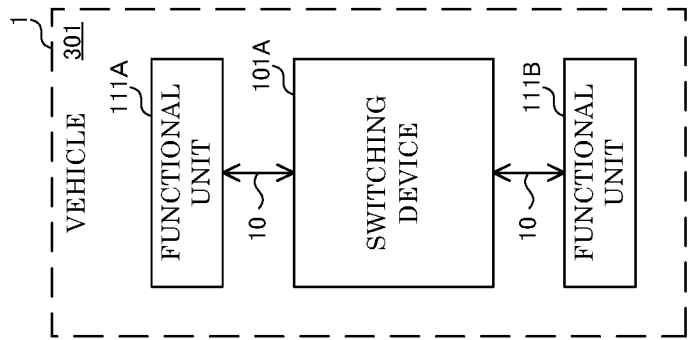

FIG. 6 is a diagram showing a state in which the configuration of the in-vehicle network system according to the embodiment of the present disclosure has been changed. As shown in FIG. 6, here, a switching device 101B (switching device 101) and a slave functional unit 111C have been added to the in-vehicle network system 301 that includes the master functional unit 111A, a switching device 101A (switching device 101), and the slave functional unit 111B.

For example, the switching device 101B is connected to the switching device 101A via an Ethernet cable 10, and the functional unit 111C is connected to the switching device 101B via an Ethernet cable 10. The configurations of the switching devices 101A and 101B are similar to the configuration of the switching device 101 shown in FIG. 2. Also, the configuration of the functional unit 111C is similar to the configuration of the functional unit 111B shown in FIG. 4.

By detecting that the power supply of the functional unit 111C was switched on, for example, the detection unit 82 of the functional unit 111C detects, as an update event, that the functional unit 111C has been added to the in-vehicle network system 301. The detection unit 82 notifies the time synchronization processing unit 83 of the occurrence of the update event.

Upon receiving the notification of the occurrence of the update event from the detection unit 82, the time synchronization processing unit 83 of the functional unit 111C performs operations similar to those performed by the time synchronization processing unit 83 of the functional unit 111B described above. Specifically, the time synchronization processing unit 83 of the functional unit 111C transmits a request message for requesting time information used for updating a data propagation delay time Td3 between the switching device 101B and the functional unit 111C, to the switching device 101B via the communication unit 81.

The time synchronization processing unit 83 receives a response message and a follow-up message from the switching device 101B, and updates the propagation delay time Td3 and corrects the time in the functional unit 111C based on the response message and the follow-up message.

Also, by detecting that the power supply of the switching device 101B was switched on, for example, the detection unit 52 of the switching device 101B detects, as an update event, that the switching device 101B has been added to the in-vehicle network system 301. The detection unit 52 notifies the time synchronization processing unit 55 of the occurrence of the update event.

Upon receiving the notification of the occurrence of the update event from the detection unit 52, the time synchronization processing unit 55 of the switching device 101B transmits a request message for requesting time information used for updating a data propagation delay time Td4 between the switching device 101A and the switching device 101B, to the switching device 101A via the relay unit 51.

The time synchronization processing unit 55 receives a response message and a follow-up message from the switching device 101A, and updates the propagation delay time Td4 and corrects the time in the switching device 101B based on the response message and the follow-up message.

Note that cases of a change in the configuration of the in-vehicle network system 301 include not only the case where an in-vehicle device such as a switching device 101 or a functional unit 111 was physically added to the in-vehicle network system 301, but also the case where the power supply of an in-vehicle device already included in the in-vehicle network system 301 was switched from off to on.

Also, the switching device 101B may be configured to transmit a request message to the switching device 101A not only in the case where the occurrence of an update event was detected, but also in the case where a request message was received from the functional unit 111C.

Specific Example 2

The in-vehicle network system 301 may further include a temperature sensor. In this case, the detection unit 52 of the switching device 101 and the detection unit 82 of the functional unit 111B may each detect, as the update event, that the temperature inside the vehicle 1 satisfies a predetermined condition.

Figure 7:
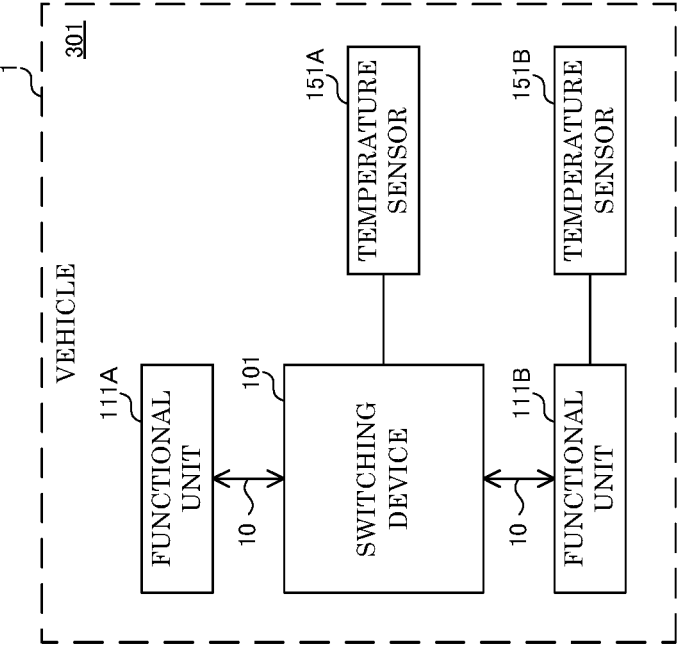
FIG. 7 is a diagram showing a configuration in which the in-vehicle network system according to this embodiment of the present disclosure includes temperature sensors.

FIG. 7 is a diagram showing a configuration in which the in-vehicle network system according to this embodiment of the present disclosure includes temperature sensors. As shown in FIG. 7, here, the in-vehicle network system 301 includes two temperature sensors 151A and 151B. For example, the temperature sensor 151A measures the temperature of the switching device 101 and outputs a measurement signal indicating the measurement result to the detection unit 52 of the switching device 101. The temperature sensor 151B measures the temperature of the functional unit 111B and outputs a measurement signal indicating the measurement result to the detection unit 82 of the functional unit 111B. Note that the temperature sensors 151A and 151B may measure the temperatures of the communication lines connected to the switching device 101 and the functional unit 111B, as the temperature in vehicle 1, for example.

The detection unit 52 of the switching device 101 determines whether or not the temperature in the vehicle 1 satisfies a predetermined condition based on the measurement signal received from the temperature sensor 151A. For example, if the temperature of the switching device 101 is greater than or equal to a predetermined threshold value, the detection unit 52 determines that the temperature inside the vehicle 1 satisfies the predetermined condition, and notifies the time synchronization processing unit 55 of the occurrence of an update event.

Upon receiving notification of the occurrence of the update event from the detection unit 52, the time synchronization processing unit 55 transmits a request message to the master functional unit 111A. The time synchronization processing unit 55 receives a response message and a follow-up message from the functional unit 111A, and corrects the time in the switching device 101 based on the response message and the follow-up message.

Also, the detection unit 82 of the functional unit 111B determines whether or not the temperature inside the vehicle 1 satisfies a predetermined condition based on the measurement signal received from the temperature sensor 151B. For example, if the temperature of the functional unit 111B is greater than or equal to a predetermined threshold value, the detection unit 82 determines that the temperature inside the vehicle 1 satisfies the predetermined condition, and notifies the time synchronization processing unit 83 of the occurrence of an update event.

Upon receiving the notification of the occurrence of the update event from the detection unit 82, the time synchronization processing unit 83 transmits a request message to the switching device 101. The time synchronization processing unit 83 receives a response message and a follow-up message from the switching device 101, and corrects the time in the functional unit 111B based on the response message and the follow-up message.

Note that the temperature sensor 151A may be built into the switching device 101. Also, the temperature sensor 151B may be built into the functional unit 111B.

Operation Flow

Next, an operation procedure when the master functional unit 111A, the switching device 101, and the slave functional unit 111B perform propagation delay time updating and time correction in the in-vehicle network system 301 will be described with reference to drawings.

The devices in the in-vehicle network system 301 each have a computer that includes a memory, and in each of such devices, an arithmetic processing unit such as a CPU in the computer reads out, from the memory, a program that includes part or all of the steps of the sequence described below, and executes the program. The programs executed by the devices can be installed from an external source. The programs executed by the devices are stored on recording media and distributed in such a form.

Example 1

Figure 8:
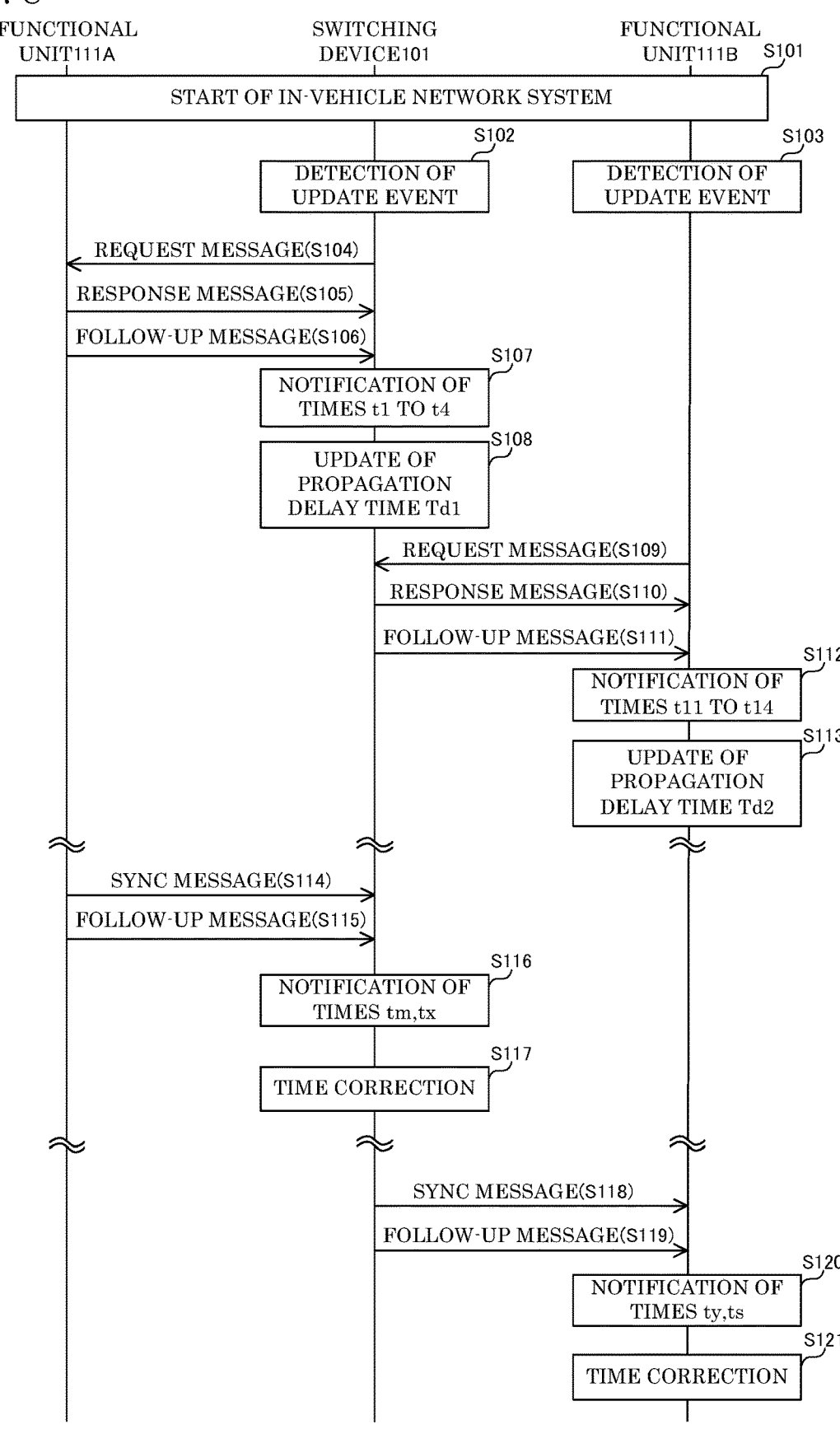
FIG. 8 is a diagram showing a sequence (Example 1) of propagation delay time updating and time correction performed by in-vehicle devices in the in-vehicle network system according to this embodiment of the present disclosure.

FIG. 8 is a diagram showing a sequence (Example 1) of propagation delay time updating and time correction performed by in-vehicle devices in the in-vehicle network system according to this embodiment of the present disclosure. Here, a case will be described in which the switching device 101 detects the occurrence of an update event and transmits a request message to the functional unit 111A.

As shown in FIG. 8, first, it is assumed that the ignition switch of the vehicle 1 is switched on, and the in-vehicle network system 301 accordingly starts up (step S101).

Next, the detection unit 52 of the switching device 101 detects, as an update event, that the ignition switch of the vehicle 1 was switched on, and notifies the time synchronization processing unit 55 of the occurrence of the update event (step S102).

Also, the detection unit 82 of the functional unit 111B detects, as an update event, that the ignition switch of the vehicle 1 was switched on, and notifies the time synchronization processing unit 83 of the occurrence of the update event (step S103).

Next, upon receiving the notification of the occurrence of the update event from the detection unit 52, the time synchronization processing unit 55 of the switching device 101 transmits a request message for requesting time information to the functional unit 111A via the relay unit 51 and the communication port 54A (step S104).

Next, the functional unit 111A transmits a response message to the switching device 101 in response to the request message transmitted from the switching device 101. At this time, the functional unit 111A includes the reception time t2 of the request message in the response message (step S105).

After transmitting the response message, the functional unit 111A then transmits a follow-up message that includes the transmission time t3 of the response message to the switching device 101 (step S106).

Next, the control unit 62 of the switching device 101 receives the response message and the follow-up message that were transmitted from the functional unit 111A, and notifies the time synchronization processing unit 55 of the time t2 included in the response message and the time t3 included in the follow-up message. Also, the control unit 62 notifies the time synchronization processing unit 55 of the transmission time t1 of the request message and the reception time t4 of the response message (step S107).

The time synchronization processing unit 55 updates the data propagation delay time Td1 between the functional unit 111A and the switching device 101 based on the times t1, t2, t3, and t4 notified from the control unit 62 (step S108).

Next, upon receiving the notification of the occurrence of the update event from the detection unit 82, the time synchronization processing unit 83 of the functional unit 111B transmits a request message for requesting time information to the switching device 101 via the communication unit 81 and the communication port 84 (step S109).

Next, when the request message transmitted from the functional unit 111B is received via the communication port 54B and the control unit 62, the time synchronization processing unit 55 of the switching device 101 transmits a response message, in response to the request message, to the functional unit 111B via the relay unit 51 and the communication port 54B. At this time, the time synchronization processing unit 55 includes the reception time t12 of the request message in the response message (step S110).

Next, after transmitting the response message, the time synchronization processing unit 55 transmits a follow-up message that includes the transmission time t13 of the response message to the functional unit 111B via the relay unit 51 (step S111).

Next, when the response message and the follow-up message that were transmitted from the switching device 101 are received via the communication port 84, the communication unit 81 of the functional unit 111B notifies the time synchronization processing unit 83 of the time t12 included in the response message and the time t13 includes in the follow-up message. Also, the communication unit 81 notifies the time synchronization processing unit 83 of the transmission time t11 of the request message and the reception time t14 of the response message (step S112).

The time synchronization processing unit 83 updates the data propagation delay time Td2 between the switching device 101 and the functional unit 111B based on the times t11, t12, t13, and t14 notified from the communication unit 81 (step S113).

Next, the functional unit 111A transmits a Sync message to the switching device 101 (step S114).

Next, the functional unit 111A transmits a follow-up message that includes the transmission time tm of the Sync message to the switching device 101 (step S115).

Next, when the Sync message and the follow-up message that were transmitted from the functional unit 111A are received via the communication port 54A, the control unit 62 of the switching device 101 notifies the time synchronization processing unit 55 of the time tm included in the follow-up message and the reception time tx of the Sync message (step S116).

Next, based on the times tm and tx notified from the control unit 62 and the propagation delay time Td1 stored in the storage unit 53, the time synchronization processing unit 55 calculates the time difference $Tx1=tm-Td1-tx$ between the time in the functional unit 111A and the time in the switching device 101.

The time synchronization processing unit 55 corrects the time in the switching device 101 using the calculated time difference Tx1. Accordingly, time synchronization is achieved between the functional unit 111A and the switching device 101 (step S117).

Next, the time synchronization processing unit 55 of the switching device 101 transmits a Sync message to the functional unit 111B via the communication port 54B (step S118).

Next, the time synchronization processing unit 55 transmits a follow-up message that includes the transmission time ty of the Sync message to the functional unit 111B via the communication port 54B (step S119).

Next, when the Sync message and the follow-up message that were transmitted from the switching device 101 are received via the communication port 84, the communication unit 81 of the functional unit 111B notifies the time synchronization processing unit 83 of the time ty includes in the follow-up message and the reception time ts of the Sync message (step S120).

Next, based on the times ty and ts notified from the communication unit 81 and the propagation delay time Td2 stored in the storage unit 85, the time synchronization processing unit 83 calculates the time difference $Tx2=ty-Td2-ts$ between the time in the switching device 101 and the time in the functional unit 111B.

The time synchronization processing unit 83 then uses the calculated time difference Tx2 to correct the time in the functional unit 111B. Accordingly, time synchronization is achieved between the functional unit 111B and the switching device 101, and as a result, time synchronization is achieved between the functional unit 111B and the functional unit 111A (step S121).

Note that the operations of steps S104 to S108 may be performed after the operations of steps S109 to S113. Moreover, the operations of steps S104 to S108 and the operations of steps S109 to S113 may be performed in parallel.

Also, the operations of steps S114 to S117 may be performed after the operations of steps S118 to S121. Moreover, the operations of steps S114 to S117 and the operations of steps S118 to S121 may be performed in parallel.

Example 2

Figure 9:
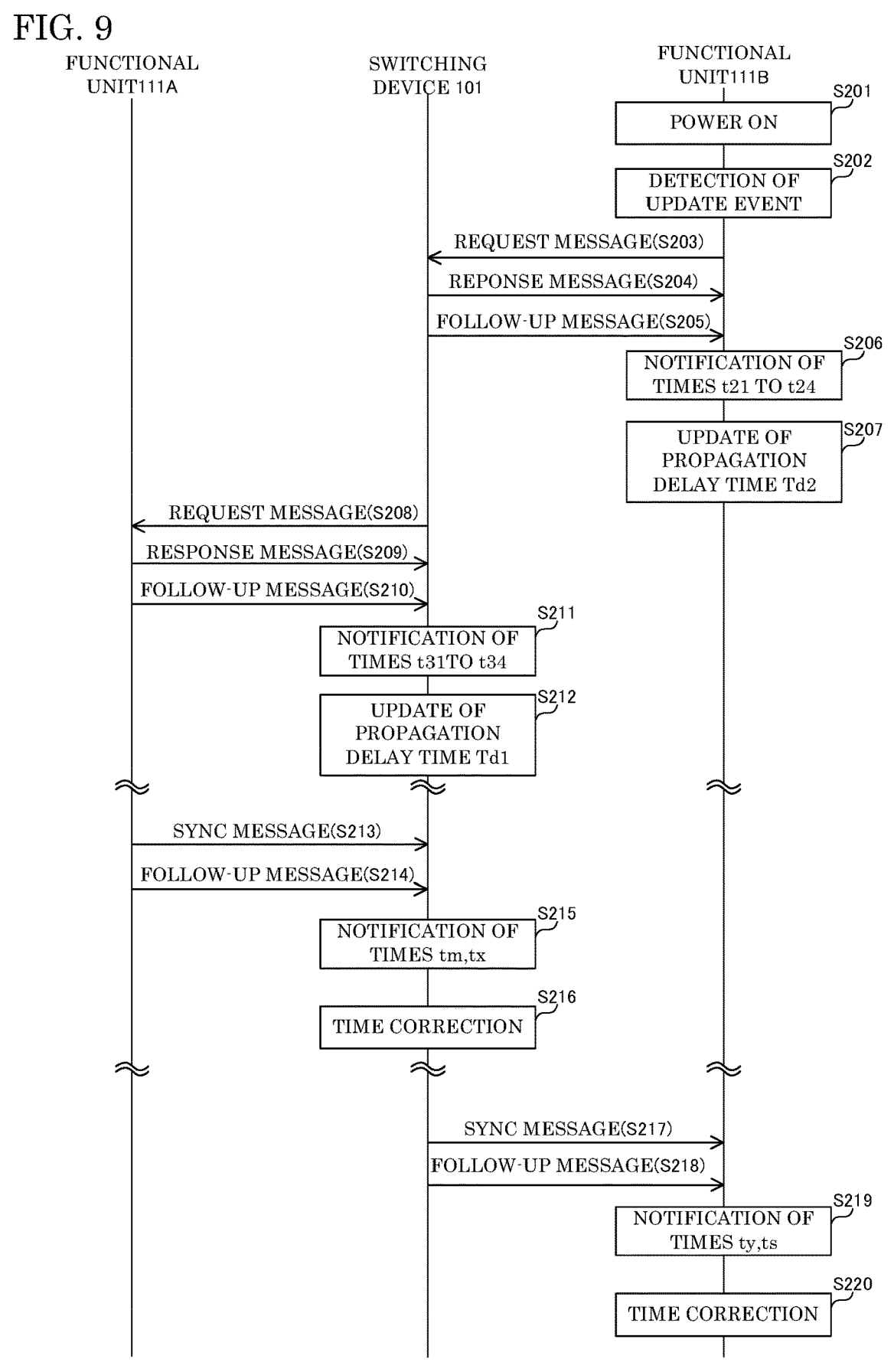

FIG. 9 is a diagram showing a sequence (Example 2) of propagation delay time updating and time correction performed by in-vehicle devices in the in-vehicle network system according to this embodiment of the present disclosure.

Here, a case will be described in which the switching device 101 receives a request message transmitted from the functional unit 111B and accordingly transmits the request message to the functional unit 111A. As shown in FIG. 9, first, it is assumed that the configuration of in-vehicle network system 301 has been changed due to the power supply of the functional unit 111B being switched on (step S201).

Next, the detection unit 82 of the functional unit 111B detects that the power supply of the functional unit 111B was switched on, and notifies the time synchronization processing unit 83 of the occurrence of an update event (step S202).

Next, upon receiving the notification of the occurrence of the update event from the detection unit 82, the time synchronization processing unit 83 transmits a request message for requesting time information to the switching device 101 via the communication unit 81 and the communication port 84 (step S203).

Next, when the request message transmitted from the functional unit 111B is received via the communication port 54B and the control unit 62, the time synchronization processing unit 55 of the switching device 101 transmits a response message, which is time information regarding the request message, to the functional unit 111B via the relay unit 51 and the communication port 54B. At this time, the time synchronization processing unit 55 includes a reception time t22 of the request message in the response message (step S204).

Next, after transmitting the response message, the time synchronization processing unit 55 transmits a follow-up message that includes a transmission time t23 of the response message to the functional unit 111B via the relay unit 51 and the communication port 54B (step S205).

Next, the communication unit 81 of the functional unit 111B receives the response message and the follow-up message that were transmitted from the switching device 101, and notifies the time synchronization processing unit 83 of the time t22 included in the response message and the time t23 included in the follow-up message. The communication unit 81 also notifies the time synchronization processing unit 83 of a transmission time t21 of the request message and a reception time t24 of the response message (step S206).

Next, the time synchronization processing unit 83 updates the data propagation delay time Td2 between the switching device 101 and the functional unit 111B based on the times t21, t22, t23, and t24 notified from the communication unit 81 (step S207).

Next, when the request message transmitted from the functional unit 111B is received via the communication port 54B and the relay unit 51, the time synchronization processing unit 55 of the switching device 101 transmits a request message for requesting the time information to functional unit 111A via the relay unit 51 and the communication port 54B (step S208).

Next, the functional unit 111A transmits a response message, which is time information regarding the request message transmitted from the switching device 101, to the switching device 101. At this time, the functional unit 111A includes a reception time t32 of the request message in the response message (step S209).

After transmitting the response message, the functional unit 111A then transmits a follow-up message that includes a transmission time t33 of the response message to the switching device 101 (step S210).

Next, upon receiving the response message and the follow-up message that were transmitted from the functional unit 111A, the control unit 62 of the switching device 101 notifies the time synchronization processing unit 55 of the time t32 included in the response message and the time t33 included in the follow-up message. The control unit 62 also notifies the time synchronization processing unit 55 of a transmission time t31 of the request message and a reception time t34 of the response message (step S211).

Next, the time synchronization processing unit 55 updates the data propagation delay time Td1 between the functional unit 111A and the switching device 101 based on the times t31, t32, t33, and t34 notified from the control unit 62 (step S212).

Next, time synchronization processing for time synchronization between the functional unit 111A and the switching device 101 (steps S213 to S216) and time synchronization processing for time synchronization between the switching device 101 and the functional unit 111B (steps S217 to S220) are performed. The operations of steps S213 to S216 are similar to the operations of steps S114 to S117 shown in FIG. 8, and the operations of steps S217 to S220 are similar to the operations of steps S118 to S121 shown in FIG. 8, and thus will not be described in detail again.

Note that the operations of steps S204 to S207 may be performed after the operations of steps S208 to S212. Also, the operations of steps S204 to S207 and the operations of steps S208 to S212 may be performed in parallel.

By the way, for example, the data propagation delay time between in-vehicle devices in an in-vehicle network is periodically updated in accordance with a protocol defined by a standard such as IEEE 802.1, and the updated propagation delay time is used in order to perform time synchronization among the in-vehicle devices.

However, when the data propagation delay time is updated, the processing load can possibly increase due to the update processing, and there is a possibility that other processing such as processing related to vehicle operation control cannot be performed smoothly.

To address this, in the switching device 101, which is an in-vehicle device according to this embodiment of the present disclosure, the time synchronization processing unit 55 performs time synchronization with another device, which is another in-vehicle device, based on the data propagation delay time between the other device and the switching device 101. The detection unit 52 detects the occurrence of a propagation delay time update event. Also, if the occurrence of an update event is detected by the detection unit 52, the time synchronization processing unit 55 requests time information used for updating the propagation delay time from the other device.

Also, in the functional unit 111, which is an in-vehicle device according to this embodiment of the present disclosure, the time synchronization processing unit 83 performs time synchronization with another device, which is another in-vehicle device, based on the data propagation delay time between the other device and the functional unit 111. The detection unit 82 detects the occurrence of a propagation delay time update event. Also, if the occurrence of an update event is detected by the detection unit 82, the time synchronization processing unit 83 requests time information used for updating the propagation delay time from the other device.

Also, in the time synchronization method according to this embodiment of the present disclosure, which is performed in the switching device 101, first, the detection unit 52 detects the occurrence of an update event regarding the updating of the data propagation delay time between another device, which is another in-vehicle device, and the switching device 101. Next, if the occurrence of an update event is detected by the detection unit 52, the time synchronization processing unit 55 requests time information used for updating the propagation delay time from the other device. Next, the time synchronization processing unit 55 updates the propagation delay time based on the time information received from the other device. The time synchronization processing unit 55 then performs time synchronization with the other device based on the updated propagation delay time.

Also, in the time synchronization method according to this embodiment of the present disclosure, which is performed in the functional unit 111, first, the detection unit 82 detects the occurrence of an update event regarding the updating of the data propagation delay time between another device, which is another in-vehicle device, and the functional unit 111. Next, if the occurrence of an update event is detected by the detection unit 82, the time synchronization processing unit 83 requests time information used for updating the propagation delay time from the other device. Next, the time synchronization processing unit 83 updates the propagation delay time based on the time information received from the other device. The time synchronization processing unit 83 then performs time synchronization with the other device based on the updated propagation delay time.

In this way, if the occurrence of an update event is detected, time information is requested and propagation delay time update processing is performed using the time information, thus making it possible to suppress the frequency of update processing to a lower level than in the case of performing update processing periodically.

Accordingly, with the in-vehicle device, the time synchronization method, and the time synchronization program according to the embodiment of the present disclosure, time synchronization can be performed smoothly using the data propagation delay time between the in-vehicle devices, and the load of update processing can be reduced.

The foregoing embodiments are to be construed in all respects as illustrative and not restrictive. The scope of the present disclosure is defined by the claims rather than the description above, and is intended to include all modifications within the meaning and scope of the claims and equivalents thereof.

The above description includes the features described in the following supplementary note.

Supplementary Note 1

An in-vehicle device including:

a processing unit configured to perform time synchronization between own device, which is the in-vehicle device, and another device, which is another in-vehicle device, based on a data propagation delay time between the other device and the own device, and detect occurrence of an update event regarding the propagation delay time, wherein in a case where the processing unit detects occurrence of the update event, the processing unit requests time information used for updating the propagation delay time from the other device, and updates the propagation delay time based on the time information received from the other device, the update event is an event in which the propagation delay time possibly changes, and the in-vehicle device is a switching device that relays data between a plurality of the other in-vehicle devices.

The invention claimed is:

1. An in-vehicle device comprising:

a processing unit configured to perform time synchronization between own device, which is the in-vehicle device, and another device, which is another in-vehicle device, based on a data propagation delay time between the other device and the own device, and detect an occurrence of an update event, regarding the propagation delay time, wherein in a case where the processing unit detects occurrence of the update event, the processing unit requests time information used for updating the propagation delay time from the other device, and wherein the processing unit detects, as the update event, that a temperature in a vehicle provided with the own device satisfies a predetermined condition.

2. The in-vehicle device according to claim 1, wherein the processing unit detects, as the update event, that an ignition switch of a vehicle provided with the own device was switched on.

3. The in-vehicle device according to claim 2, wherein the processing unit detects, as the update event, that a configuration of an in-vehicle network including the own device was changed.

4. The in-vehicle device according to claim 2, further comprising:

a switching unit configured to relay data between a first other device and a second other device that are the other devices, wherein the first other device transmits, to the in-vehicle device, a first time information request that requests first time information used for updating a data propagation delay time between the in-vehicle device and the first other device, the switching unit receives the first time information request from the first other device and outputs the received first time information request to the processing unit, the processing unit receives the first time information request from the switching unit and outputs, to the switching unit, a second time information request that requests second time information used for updating a data propagation delay time between the second other device and the own device, and the switching unit receives the second time information request from the processing unit and transmits the received second time information request to the second other device.

5. The in-vehicle device according to claim 1, wherein the temperature in the vehicle is a temperature of a communication line between the own device and the other device.

6. The in-vehicle device according to claim 5, further comprising:

a switching unit configured to relay data between a first other device and a second other device that are the other devices, wherein the first other device transmits, to the in-vehicle device, a first time information request that requests first time information used for updating a data propagation delay time between the in-vehicle device and the first other device, the switching unit receives the first time information request from the first other device and outputs the received first time information request to the processing unit, the processing unit receives the first time information request from the switching unit and outputs, to the switching unit, a second time information request that requests second time information used for updating a data propagation delay time between the second other device and the own device, and the switching unit receives the second time information request from the processing unit and transmits the received second time information request to the second other device.

7. The in-vehicle device according to claim 1, wherein the processing unit detects, as the update event, that a configuration of an in-vehicle network including the own device was changed.

8. The in-vehicle device according to claim 7, further comprising:

a switching unit configured to relay data between a first other device and a second other device that are the other devices, wherein the first other device transmits, to the in-vehicle device, a first time information request that requests first time information used for updating a data propagation delay time between the in-vehicle device and the first other device, the switching unit receives the first time information request from the first other device and outputs the received first time information request to the processing unit, the processing unit receives the first time information request from the switching unit and outputs, to the switching unit, a second time information request that requests second time information used for updating a data propagation delay time between the second other device and the own device, and the switching unit receives the second time information request from the processing unit and transmits the received second time information request to the second other device.

9. A time synchronization method in an in-vehicle device, comprising the steps of:

detecting an occurrence of an update event regarding updating of a propagation delay time between own device, which is the in-vehicle device, and another
device, which is another in-vehicle device;

requesting, if occurrence of the update event is detected,
time information used for updating the propagation
delay time from the other device;

updating the propagation delay time based on the time
information received from the other device; and performing time synchronization with the other device
based on the updated propagation delay time; and detecting, as the update event, that a temperature in a
vehicle provided with the own device satisfies a pre-
determined condition.

10. A time synchronization computer program product
used in an in-vehicle device, the computer program product
comprising a non-transitory, machine-readable medium stor-
ing instructions which, when executed by at least one
programmable processor, causes at least one programmable
processor to perform operations comprising:

actuate a processing unit to perform time synchronization
between own device, which is the in-vehicle device,
and another device, which is another in-vehicle device,
based on a data propagation delay time between the
other device and the own device, and detect an occur-
rence of an update event, regarding the propagation
delay time, wherein in a case where the processing unit detects
occurrence of the update event, the processing unit
requests time information used for updating the propa-
gation delay time from the other device; and wherein the processing unit detects, as the update event,
that a temperature in a vehicle provided with the own
device satisfies a predetermined condition.

11. An in-vehicle device comprising:

a processing unit configured to perform time synchroni-
zation between own device, which is the in-vehicle
device, and another device, which is another in-vehicle
device, based on a data propagation delay time between
the other device and the own device, and detect an
occurrence of an update event, regarding the propaga-
tion delay time, wherein in a case where the processing unit detects
occurrence of the update event, the processing unit
requests time information used for updating the propa-
gation delay time from the other device;

a switching unit configured to relay data between a first
other device and a second other device that are the other
devices, wherein the first other device transmits, to the in-vehicle
device, a first time information request that requests
first time information used for updating a data propa-
gation delay time between the in-vehicle device and the
first other device, the switching unit receives the first time information
request from the first other device and outputs the
received first time information request to the processing
unit, the processing unit receives the first time information
request from the switching unit and outputs, to the
switching unit, a second time information request that
requests second time information used for updating a
data propagation delay time between the second other
device and the own device, and the switching unit receives the second time information
request from the processing unit and transmits the
received second time information request to the second
other device.

12. A time synchronization method in an in-vehicle
device, comprising the steps of:

detecting occurrence of an update event regarding updat-
ing of a propagation delay time between own device,
which is the in-vehicle device, and another device,
which is another in-vehicle device;

requesting, if occurrence of the update event is detected,
time information used for updating the propagation
delay time from the other device;

updating the propagation delay time based on the time
information received from the other device; and performing time synchronization with the other device
based on the updated propagation delay time;

relaying data between a first other device and a second
other device that are the other devices, wherein the first other device transmits, to the in-vehicle
device, a first time information request that requests
first time information used for updating a data propa-
gation delay time between the in-vehicle device and the
first other device, providing a switching unit that receives the first time
information request from the first other device and
outputs the received first time information request to a
processing unit, the processing unit receives the first time information
request from the switching unit and outputs, to the switching
unit, a second time information request that requests second
time information used for updating a data propagation delay
time between the second other device and the own device,
and the switching unit receives the second time information
request from the processing unit and transmits the
received second time information request to the second
other device.

13. A time synchronization computer program product
used in an in-vehicle device, the computer program product
comprising a non-transitory, machine-readable medium stor-
ing instructions which, when executed by at least one
programmable processor, causes at least one programmable
processor to perform operations comprising:

actuate a processing unit to perform time synchronization
between own device, which is the in-vehicle device,
and another device, which is another in-vehicle device,
based on a data propagation delay time between the
other device and the own device, and detect an occur-
rence of an update event, regarding the propagation
delay time, wherein in a case where the processing unit detects
occurrence of the update event, the processing unit
requests time information used for updating the propa-
gation delay time from the other device; and actuate a switching unit to relay data between a first other
device and a second other device that are the other
devices, wherein the first other device transmits, to the in-vehicle
device, a first time information request that requests
first time information used for updating a data propa-
gation delay time between the in-vehicle device and the
first other device, the switching unit receives the first time information
request from the first other device and outputs the
received first time information request to the processing
unit, the processing unit receives the first time infor-
mation request from the switching unit and outputs, to
the switching unit, a second time information request
that requests second time information used for updating a data propagation delay time between the second other device and the own device, and the switching unit receives the second time information request from the processing unit and transmits the received second time information request to the second other device.

* * * * *